United States Patent
Nakamoto et al.

(10) Patent No.: US 9,405,092 B2
(45) Date of Patent: Aug. 2, 2016

(54) CONTROL APPARATUS, IMAGE PICKUP SYSTEM, AND CONTROL METHOD

(71) Applicant: CANON KABUSHIKI KAISHA, Tokyo (JP)

(72) Inventors: Miyako Nakamoto, Kawasaki (JP); Satoshi Hirota, Kawasaki (JP); Takayuki Ishii, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/283,951

(22) Filed: May 21, 2014

(65) Prior Publication Data

US 2014/0347549 A1 Nov. 27, 2014

(30) Foreign Application Priority Data

May 27, 2013 (JP) .................................. 2013-110625

(51) Int. Cl.
*G02B 7/36* (2006.01)

(52) U.S. Cl.
CPC ........................................ *G02B 7/36* (2013.01)

(58) Field of Classification Search
CPC ............ G02B 7/36; G02B 7/285; G02B 7/32; G02B 7/40; H04N 5/23212
See application file for complete search history.

(56) References Cited

U.S. PATENT DOCUMENTS

| 2005/0110892 A1* | 5/2005 | Yun .............................. 348/354 |
| 2010/0171868 A1* | 7/2010 | Katsuyama et al. .......... 348/345 |
| 2011/0249150 A1* | 10/2011 | Shintani et al. ............ 348/240.3 |
| 2011/0273608 A1* | 11/2011 | Tsukada ...................... 348/345 |

FOREIGN PATENT DOCUMENTS

| JP | 2012-118154 A | 6/2012 |
| JP | 2013-003501 A | 1/2013 |

* cited by examiner

*Primary Examiner* — Mekonnen Dagnew
(74) *Attorney, Agent, or Firm* — Cowan, Liebowitz & Latman, P.C.

(57) ABSTRACT

A control apparatus includes a first focus detection unit that performs focus detection by a phase difference method based on an image signal obtained from an image pickup element, a second focus detection unit that performs focus detection by a contrast method, and a control unit that performs focusing, the control unit performs the focusing, in a first mode, by using a detection result of the first focus detection unit, and performs the focusing, in a second mode, by selectively using one of the detection result of the first focus detection unit and a detection result of the second focus detection unit according to lens information, and the first mode is a mode in which the focusing is repeated, and the second mode is a mode in which a lens is stopped after the focusing.

34 Claims, 6 Drawing Sheets

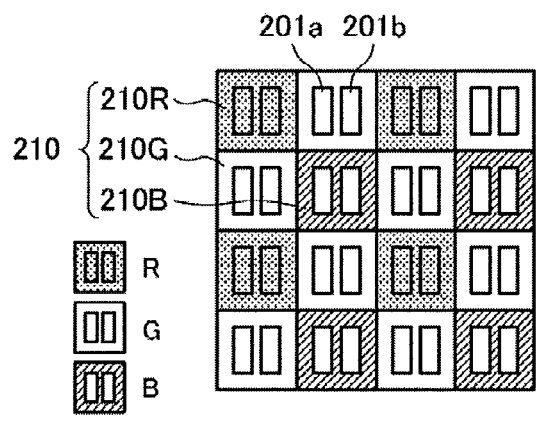
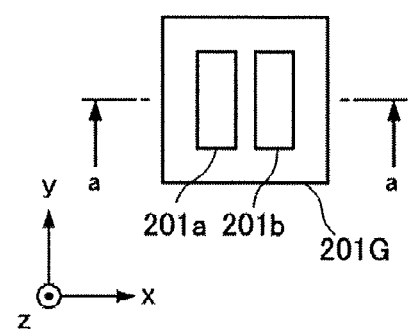
FIG. 3A   FIG. 3B
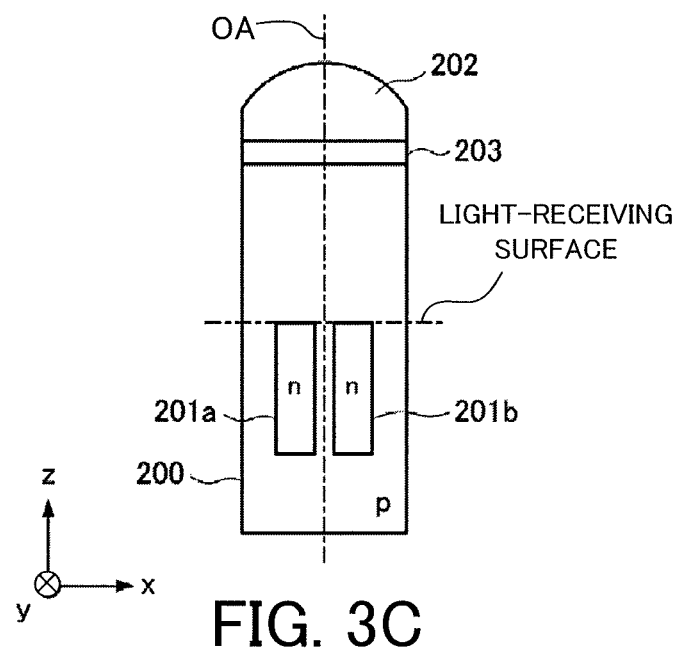
FIG. 3C

CONTROL APPARATUS, IMAGE PICKUP SYSTEM, AND CONTROL METHOD

BACKGROUND OF THE INVENTION

1. Field of the Invention

The present invention relates to an image pickup apparatus (control apparatus) capable of performing continuous AF and one-shot AF.

2. Description of the Related Art

Contrast AF and imaging-plane phase difference AF have been conventionally known as methods for detecting a focus state using an image pickup element. The contrast AF is a method of performing focusing based on contrast information obtained from an image signal while driving a lens, and is capable of a more accurate focusing operation. In contrast in the imaging-plane phase difference AF, a plurality of focus detection pixels receive a divided light beam obtained by diving a light beam passing through the exit pupil of a lens, to thereby calculate the driving amount of the lens required for in-focus based on the shift amount of signals output according to the amount of the received light. The imaging-plane phase difference AF allows a fast and smooth focusing operation. The imaging-plane phase difference AF, however, has a degraded in-focus accuracy as compared to the contrast AF in some cases, because of optical characteristics of the lens and the environment. To achieve a high in-focus accuracy, the focusing is therefore preferably performed through the contrast AF.

Alternatively, a continuous AF method (continuous AF) is known to consecutively perform focusing to maintain an in-focus state at movie shooting or as an auxiliary function for focusing. A smooth in-focus operation is required at movie shooting, whereas a fast focusing is required as an auxiliary function for focusing. For this reason, the imaging-plane phase difference AF is preferably employed in the continuous AF.

Japanese Patent Laid-open No. 2012-118154 discloses an image pickup apparatus, in a hybrid AF of the imaging-plane phase difference AF and the contrast AF, when the stop of a lens is narrowed, a focusing operation is performed by performing wobbling only on a wobbling compatible lens by the contrast AF. Japanese Patent Laid-open No. 2013-3501 discloses a camera that predicts the focus detection position of a main object to thereby switch the imaging-plane phase difference AF and the contrast AF accordingly.

In the inventions of Japanese Patent Laid-open No. 2012-118154 and Japanese Patent Laid-open No. 2013-3501, however, it is difficult to maintain the quality of the continuous AF and to improve the in-focus accuracy of one-shot AF in an image pickup apparatus capable of performing the continuous AF and the one-shot AF.

BRIEF SUMMARY OF THE INVENTION

The present invention provides a control apparatus, an image pickup system, and a control method that are capable of shooting a still image with a high in-focus accuracy while maintaining the quality of the continuous AF.

A control apparatus as one aspect of the present invention includes a first focus detection unit configured to perform focus detection by a phase difference method based on an image signal obtained from an image pickup element, a second focus detection unit configured to perform focus detection by a contrast method, and a control unit configured to perform focusing, the control unit is configured to perform the focusing, in a first mode, by using a detection result of the first focus detection unit, and perform the focusing, in a second mode, by selectively using one of the detection result of the first focus detection unit and a detection result of the second focus detection unit according to lens information, and the first mode is a mode in which the focusing is repeated, and the second mode is a mode in which a lens is stopped after the focusing.

A control apparatus as another aspect of the present invention includes a first focus detection unit configured to perform focus detection by a phase difference method based on an image signal obtained from an image pickup element, a second focus detection unit configured to perform focus detection by a contrast method, and a control unit configured to perform focusing, the control unit has a first mode in which the focusing is performed by using a detection result of the first focus detection unit, and a second mode in which the focusing is performed by selectively using one of the detection result of the first focus detection unit and a detection result of the second focus detection unit, and the control unit is configured to select one of the first mode and the second mode according to lens information.

An image pickup system as another aspect of the present invention includes a lens apparatus including an image pickup optical system and the control apparatus.

A control method as another aspect of the present invention includes a first focus detection step of performing focus detection by a phase difference method based on an image signal obtained from an image pickup element, a second focus detection step of performing focus detection by a contrast method, and a control step of performing focusing, the control step includes performing the focusing, in a first mode, by using a detection result of the first focus detection step, and performing the focusing, in a second mode, by selectively using one of the detection result of the first focus detection step and a detection result of the second focus detection step, and the first mode is a mode in which the focusing is repeated, and the second mode is a mode in which a lens is stopped after the focusing.

A control method as another aspect of the present invention includes a first focus detection step of performing focus detection by a phase difference method based on an image signal obtained from an image pickup element, a second focus detection step of performing focus detection by a contrast method, and a control step of performing focusing, in the control step, one of a first mode and a second mode is selected according to lens information, and the first mode is a mode in which the focusing is performed by using a detection result of the first focus detection step, and the second mode is a mode in which the focusing is performed by selectively using one of the detection result of the first focus detection step and a detection result of the second focus detection step.

Further features and aspects of the present invention will become apparent from the following description of exemplary embodiments with reference to the attached drawings.

BRIEF DESCRIPTION OF THE DRAWINGS

FIGS. 3A to 3C are diagrams illustrating the structure of an image pickup element (image pickup pixel) in each of the embodiments.

DESCRIPTION OF THE EMBODIMENTS

Figure 1:
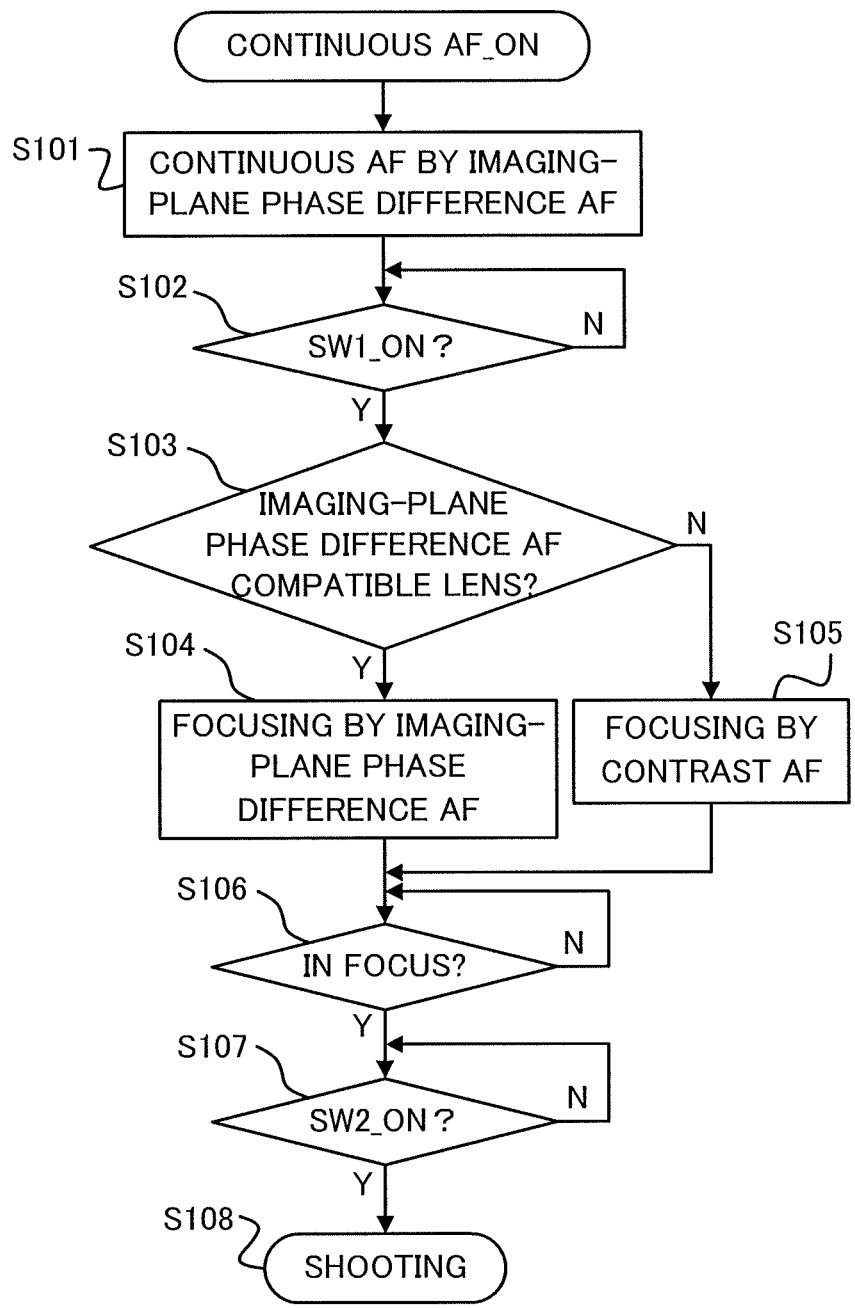
FIG. 1 is a flowchart of a focusing operation (control method of an image pickup apparatus) in a first embodiment.

Exemplary embodiments of the present invention will be described below with reference to the accompanied drawings. In each of the drawings, the same elements will be denoted by the same reference numerals and the duplicate descriptions thereof will be omitted.

Figure 2:
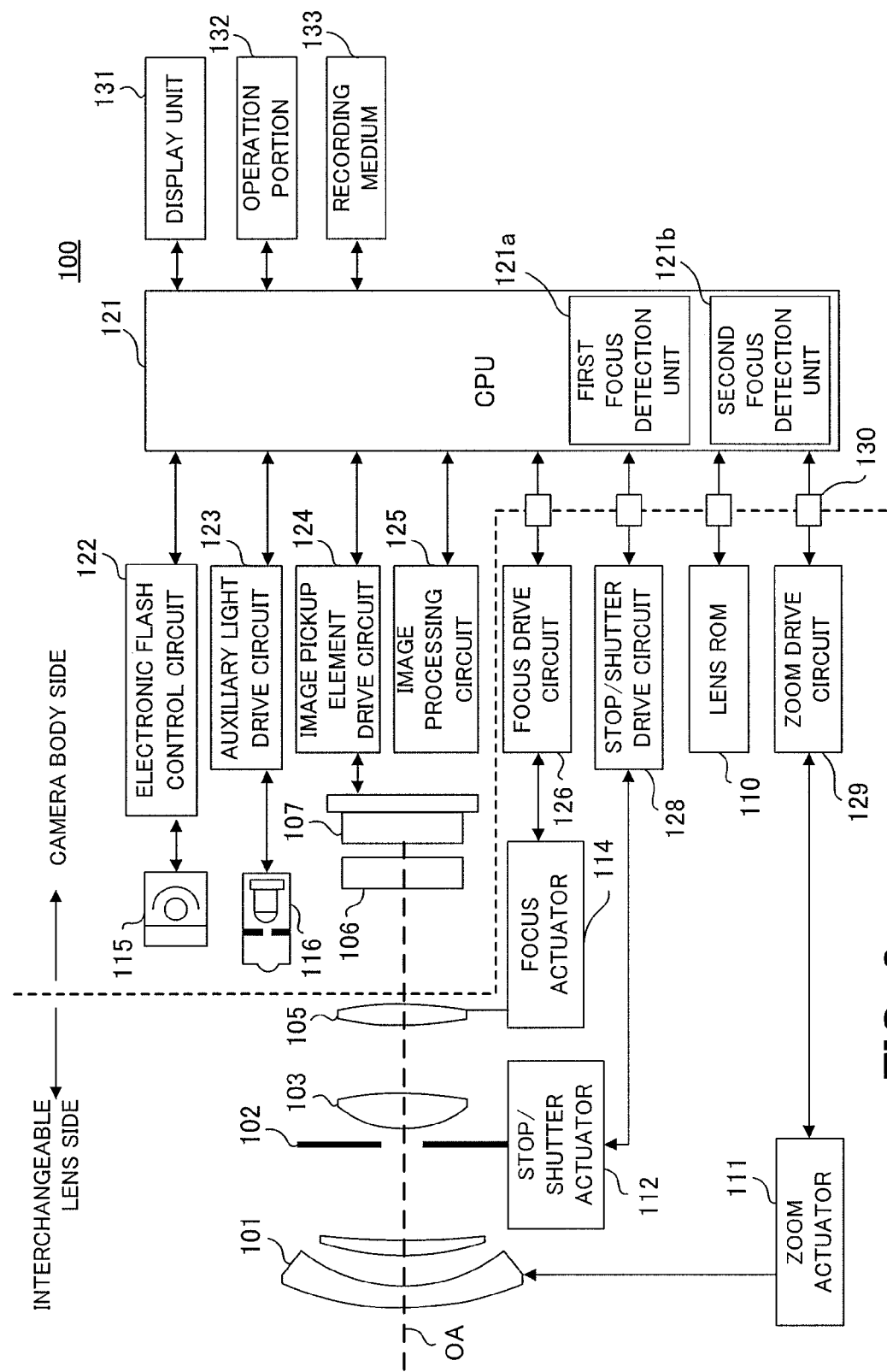
FIG. 2 is a block diagram illustrating the configuration of an image pickup apparatus in each of embodiments.

First, referring to FIG. 2, an image pickup apparatus (image pickup system) in an embodiment of the present invention will be described. FIG. 2 is a block diagram illustrating the configuration of the image pickup apparatus (image pickup system 100) in the present embodiment. The image pickup system 100 of the present embodiment is a digital camera system including the image pickup apparatus (camera body) and a lens apparatus (interchangeable lens) detachable from the image pickup apparatus. The image pickup apparatus (image pickup system 100) of the present embodiment is capable of performing focusing by an imaging-plane phase difference AF method and a contrast AF method, as described later. In FIG. 2, the position relation of each portion is described with an object side (interchangeable lens side) defined as a front side of the image pickup apparatus (camera body).

A first lens unit 101 is positioned at a front side closest to the object (at an object side) among a plurality of lens units constituting an image pickup lens (an image pickup optical system), and is held by a lens barrel to be movable forward and backward in a direction along an optical axis OA (an optical axis direction). A shutter 102 serving as a stop adjusts light intensity at the time of shooting by adjusting its opening diameter, and functions as an exposure adjustment shutter at the time of shooting a still image. A second lens unit 103 moves forward and backward integrally with the shutter 102 serving as a stop in the optical axis direction, and has a zoom function of performing a magnification-varying operation cooperatively with the forward and backward movement of the first lens unit 101. A third lens unit 105 is a focus lens unit that performs focusing by moving forward and backward in the optical axis direction. An optical low-pass filter 106 is an optical element for reducing a false color or moire in a shot image.

An image pickup element 107 photoelectrically converts an object image (an optical image) and includes, for example, a CMOS sensor or a CCD sensor, and its peripheral circuits. The image pickup element 107 is, for example, a two-dimensional single panel color sensor with a primary color mosaic filter of the Bayer array on-chip formed on a light receiving pixel having m pixels in the lateral direction and n pixels in the longitudinal direction.

A lens ROM 110 (read-only memory) stores unique data (lens information such as a lens ID) for each interchangeable lens detachable from the camera body. The lens information stored in the lens ROM 110 is provided to a CPU 121 (central processing unit) described later through communication because it is needed for performing focus detection and the like.

A zoom actuator 111 rotates (drives) a cam cylinder, not illustrated, to move the first lens unit 101 and the second lens unit 103 along the optical axis direction and thereby perform a magnification-varying operation. A stop/shutter actuator 112 controls the opening diameter of the shutter 102 serving as a stop to adjust the light intensity (shooting light intensity), and controls exposure time while shooting a still image. A focus actuator 114 moves the third lens unit 105 in the optical axis direction to perform focusing.

An electronic flash 115 is an illumination apparatus used to illuminate an object. The electronic flash 115 is a flash illumination apparatus provided with a xenon tube or an illumination apparatus provided with an LED (light-emitting diode) consecutively emitting light. An AF auxiliary light unit 116 projects an image of a mask having a predetermined opening pattern onto an object through a projection lens. This enhances focus detection capability for a dark object or a low contrast object.

The CPU 121 is a control unit (control apparatus) that performs various controls of the image pickup apparatus (camera body). The CPU 121 includes a calculation unit, a ROM (read-only memory), a RAM (random access memory), an A/D convertor, a D/A convertor, a communication interface circuit, and the like. The CPU 121 reads out and executes a predetermined program stored in the ROM to drive each unit and control a series of operations such as focus detection, shooting, image processing, and recording.

The CPU 121 includes a first focus detection unit 121a and a second focus detection unit 121b. The first focus detection unit 121a performs focus detection (imaging-plane phase difference AF) by a phase difference method based on image signals obtained from the focus detection pixels of the image pickup element 107. The second focus detection unit 121b performs focus detection (contrast AF) by a contrast method. The CPU 121 selects the first focus detection unit 121a or the second focus detection unit 121b to perform focusing, as described below. The control apparatus of the present embodiment may include the CPU 121 only, or the CPU 121 and other elements (other control units).

An electronic flash control circuit 122 controls lighting of the electronic flash 115 in synchronization with a shooting operation. An auxiliary light drive circuit 123 controls lighting of the AF auxiliary light unit 116 in synchronization with a focus detection operation. An image pickup element drive circuit 124 controls an image pickup operation of the image pickup element 107, and performs an A/D conversion on the obtained image signal to transmit it to the CPU 121. An image processing circuit 125 performs processing such as γ (gamma) conversion, color interpolation, JPEG compression, or the like on image data obtained from the image pickup element 107. JPEG stands for "Joint Photographic Experts Group".

A focus drive circuit 126 and the focus actuator 114 constitute a focus unit. The focus drive circuit 126 drives the focus actuator 114 based on a result of focus detection and moves the third lens unit 105 along the optical axis direction, thereby adjusting an amount of focus shift (an amount of defocus). A stop/shutter drive circuit 128 drives the stop/shutter actuator 112 to control the opening diameter of the shutter 102 serving as a stop. A zoom drive circuit 129 drives the zoom actuator 111 according to a zoom operation by a photographer. The focus drive circuit 126, the stop/shutter drive circuit 128, and the zoom drive circuit 129 are each connected to the CPU 121 in the image pickup apparatus (camera body) through a terminal 130 (communication unit).

A display unit 131 includes, for example, an LCD (liquid crystal display device). The display unit 131 displays information on a shooting mode, a preview image before shooting, a shot image for confirmation, an in-focus state display image during the focus detection, or the like. An operation portion 132 includes a power switch, a release (shooting trigger) switch, a zoom operation switch, a shooting mode selection switch, and the like. The release switch has switches for two steps, a half-pressed state (SW1_ON) and a fully-pressed state (SW2_ON). A recording medium 133 is, for example, a flash memory detachable from the image pickup apparatus and records a shot image (image data).

Subsequently, referring to FIGS. 3A to 3C, the structure of the image pickup element 107 in the present embodiment will be described. FIGS. 3A to 3C are diagrams illustrating the structure of the image pickup element 107. FIG. 3A is an explanatory diagram of the pixel array of the image pickup element 107, FIG. 3B is an enlarged diagram of a pixel portion 210G in FIG. 3A, and FIG. 3C is a cross-sectional diagram along line a-a in FIG. 3B.

FIG. 3A illustrates the pixel array of the image pickup element 107 (two-dimensional CMOS sensor) in a 4×4 pixel range. A pixel portion 210 is arranged in a 2×2 Bayer array. The pixel portions 210G having spectral sensitivity for G (green) are arranged as two pixels in a diagonal direction. A pixel portion 210R having spectral sensitivity for R (red) and a pixel portion 210B having spectral sensitivity for B (blue) are arranged as the other two pixels. The pixel portions 210R, 210G, and 210B each includes two sub-pixels 201a and 201b for pupil division. The sub-pixel 201a is a first pixel that receives a light beam passing through a first pupil region of the image pickup optical system. The sub-pixel 201b is a second pixel that receives a light beam passing through a second pupil region of the image pickup optical system. A detection element (detection portion) constituting each pixel functions as an image pickup element (image pickup pixel) and a focus detection element (focus detection pixel).

For the coordinate axes denoted by x, y, and z in FIG. 3B, the x-y plane is positioned in the plane of the sheet of FIG. 3B, and the z axis is vertical to the plane of the sheet. The sub-pixels 201a and 201b are arranged along a direction parallel to the x axis.

For the coordinate axes denoted by x, y, and z in FIG. 3C, the x-z plane is positioned in the plane of the sheet of FIG. 3C, and the y axis is vertical to the plane of the sheet. The detection portion includes a photodiode including a p-type layer 200 and an n-type layer. A micro lens 202 is positioned at a predetermined distance apart from a light-receiving surface in the z axis direction (direction of the optical axis OA). The micro lens 202 is formed on a wiring layer 203.

In the present embodiment, the sub-pixels 201a and 201b for pupil division are provided to all the pixel portions 210R, 210G, and 210B of the image pickup element 107. The sub-pixels 201a and 201b are used as focus detection pixels (detection elements). The present embodiment is, however, not limited to this configuration, and may have a configuration in which the focus detection pixels (detection elements) compatible with pupil division are provided only to a part of pixels among the all pixels.

Figure 4:
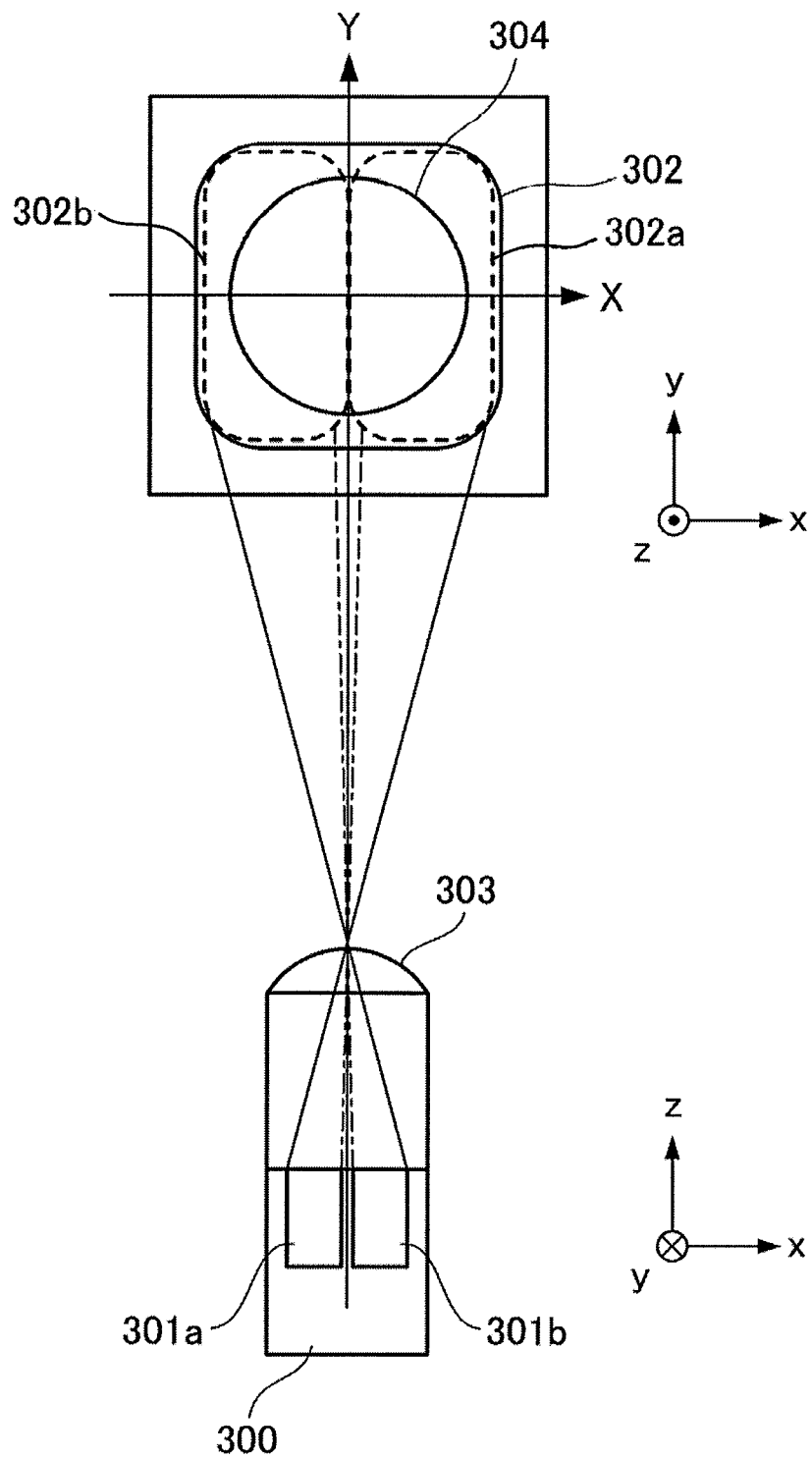
FIG. 4 is an explanatory diagram of a pupil division function of the image pickup element in each of the embodiments.

Subsequently, referring to FIG. 4, a pupil division function of the image pickup element 107 will be described. FIG. 4 is an explanatory diagram for the pupil division function of the image pickup element 107 and illustrates pupil division at one of the pixel portions. For the coordinate axes (x, y, z) of the detection portion (pixel portion) illustrated in the lower portion of FIG. 4, the x-z plane is positioned in the plane of the sheet of FIG. 4, and the y axis is vertical to the plane of the sheet. The detection portion includes a p-type layer 300 and n-type layers 301a and 301b. The p-type layer 300 and the n-type layer 301a constitute a detection element corresponding to the sub-pixel 201a. The p-type layer 300 and the n-type layer 301b constitute a detection element corresponding to the sub-pixel 201b. A micro lens 303 is disposed on the z axis.

The upper portion of FIG. 4 illustrates an exit pupil 302 and a frame 304 (a stop frame or a lens frame, for example). For the coordinate axes (x, y, z) illustrated in the upper portion of FIG. 4, the x-y plane is positioned in the plane of the sheet of FIG. 4, and the z axis is vertical to the plane of the sheet.

One pixel portion includes the n-type layers 301a and 301b embedded in the p-type layer 300 to form two sub-pixels. The two sub-pixels are regularly arranged in the x direction. The two sub-pixels are arranged being decentered in the positive x direction and the negative x direction, which allows pupil division with one micro lens 303. FIG. 4 illustrates a pupil 302a of an image signal A and a pupil 302b of an image signal B, as the exit pupil 302. The image signal A is a first image signal obtained at the sub-pixel corresponding to the n-type layer 301a decentered in the negative x direction. The image signal B is a second image signal obtained at the sub-pixel corresponding to the n-type layer 301b decentered in the positive x direction. The CPU 121 detects the amount of relative image shift between the image signal A and the image signal B and calculates the amount of focus shift (the amount of defocus) by correlation calculation, to thereby detect the focus state of the image pickup lens (perform focus detection). The CPU 121 performs the processing of controlling the amount of focus shift of the image pickup lens through the focus unit (the focus drive circuit 126 and the focus actuator 114) based on a detection result of the focus state.

The example illustrated in FIG. 4 explains a configuration to deal with an object having luminance distribution in the x direction. The same configuration is applicable in the y direction and thus is capable of dealing with an object having luminance distribution in the y direction. The present embodiment describes an example that a plurality of decentered sub-pixels are arranged in a one-dimensional direction (the x direction) within one pixel to perform pupil division. The arrangement of the sub-pixels (pupil division method) is, however, not limited to this arrangement, and the sub-pixels for pupil division may be arranged on a two-dimensional plane defined by the x direction and the y direction. The present embodiment also describes an example that a plurality of sub-pixels are arranged for one micro lens on which pupil division is performed. The arrangement of the sub-pixels (pupil division method) is, however, not limited to this arrangement, and may be such that one decentered pixel is allocated for one micro lens and focus detection is performed using a plurality of pixels having different amounts of decentering.

Examples of a method of detecting the focus state through the image pickup element 107 include a focusing method (contrast AF) by contrast. The contrast AF is a method of performing focusing based on contrast information of signals (pixel signals) from the image pickup element 107 while moving the image pickup lens. The contrast AF allows a more accurate focusing operation. The contrast AF is performed by the CPU 121 (second focus detection unit).

Apart from the contrast AF, another method of detecting the focus state is a phase difference detecting method (shift method). In the phase difference detecting method, a light beam passing through the exit pupil of the image pickup lens is divided into two beams, and the divided light beams are received by a pair of focus detection sensors, respectively. Then, detection is made on the amount of shift between signals output according to the received light intensities, that is, the amount of relative positional shift in the division direction of the light beam, thereby directly obtaining a required amount of driving the image pickup lens to achieve in-focus. The phase difference detecting method allows a fast focusing operation because the amount of focus shift and the in-focus direction are obtained by performing once an accumulation operation with a focus detection pixel (focus detection sensor). The phase difference detecting method also allows a smooth focusing without overshooting the in-focus position for an object by driving the image pickup lens while simultaneously obtaining the amount of focus shift and the in-focus direction. Another configuration utilizing the phase difference detecting method is a focusing method (imaging-plane phase difference AF) that performs focus detection by the phase difference detecting method with a focus detection pixel provided to the image pickup element 107. The imaging-plane phase difference AF is performed by the CPU 121 (first focus detection unit).

In shooting a still image, the image pickup apparatus (image pickup system 100) performs focusing before shooting. In shooting, the third lens unit 105 is preferably stopped at the in-focus position. For this purpose, in a mode (one-shot AF; a second mode), when focusing is performed in the still image shooting, the focus actuator 114 is controlled to stop the third lens unit 105 at the in-focus position after the in-focus state is obtained (after the focusing is performed). The one-shot AF requires a high in-focus accuracy and thus requires a highly accurate focusing.

In contrast, the imaging-plane phase difference AF has a lower in-focus accuracy than that of the contrast AF in some cases because of the optical characteristics of the image pickup lens and the environment. In the case of the one-shot AF requiring a high in-focus accuracy, its focusing method is thus needed to be controlled to switch to the contrast AF.

In a mode (continuous AF; a first mode), a focusing method is employed that continuously maintains the in-focus state of the third lens unit 105 by consecutively performing focusing at movie shooting or as an auxiliary function for focusing. A smooth in-focus operation is required while shooting a moving image, whereas a fast focusing is required as an auxiliary function for the focusing. For this reason, the imaging-plane phase difference AF is preferably employed when the continuous AF is performed.

First Embodiment

Next, referring to FIG. 1, a control method (focusing operation) of an image pickup apparatus in a first embodiment of the present invention will be described. FIG. 1 is a flowchart of the focusing operation in the present embodiment and illustrates a case where a continuous AF control is on (continuous AF control is performed). The steps illustrated in FIG. 1 are each performed mainly in response to a command (an instruction) from the CPU 121.

First, at step S101, the CPU 121 starts the continuous AF by the imaging-plane phase difference AF (by selecting the first focus detection unit 121a). Subsequently, at step S102, the CPU 121 determines whether the release switch of the operation portion 132 is in the half-pressed state (SW1_ON). When the release switch is not in the half-pressed state (SW1_ON), the determination at step S102 repeats. During the repetition, the continuous AF by the imaging-plane phase difference AF is continuously performed. When the release switch is in the half-pressed state (SW1_ON), the flow proceeds to step S103. The CPU 121 then starts a control to switch from the continuous AF to the one-shot AF. In other words, the CPU 121 switches from the continuous AF mode to the one-shot AF mode when the release switch becomes the half-pressed state.

At step S103, the CPU 121 determines whether the interchangeable lens attached to the image pickup apparatus (camera body) is a lens compatible with the imaging-plane phase difference AF (imaging-plane phase difference AF compatible lens). This determination is based on the lens ID contained in the lens information in the lens ROM 110. When the interchangeable lens attached to the image pickup apparatus is the imaging-plane phase difference AF compatible lens, the flow proceeds to step S104. When the interchangeable lens is not the imaging-plane phase difference AF compatible lens, the flow proceeds to step S105.

At step S104, the CPU 121 performs focusing (one-shot AF) by the imaging-plane phase difference AF (by selecting the first focus detection unit 121a). Alternatively at step S105, the CPU 121 performs focusing (one-shot AF) by the contrast AF (by selecting the second focus detection unit 121b). In the present embodiment, the CPU 121 changes the one-shot AF method (the imaging-plane phase difference AF or the contrast AF) depending on whether the interchangeable lens attached to the image pickup apparatus is the imaging-plane phase difference AF compatible lens.

Subsequently, at step S106, the CPU 121 determines whether the lens is in focus (the in-focus state has been achieved) through the focusing operation at step S104 or step S105. When the in-focus state has not been achieved, the determination at step S106 repeats. When the in-focus state has been achieved, the flow proceeds to step S107.

At step S107, the CPU 121 determines whether the release switch is in the fully-pressed state (SW2_ON). When the release switch is not in the fully-pressed state (SW2_ON), the determination at step S107 repeats. When the release switch is in the fully-pressed state (SW2_ON), the flow proceeds to step S108. At step S108, the CPU 121 performs a shooting operation and obtains a shot image (image data) from the image pickup element 107.

As described above, the CPU 121 (control unit) performs focusing through the first focus detection unit 121a in the first mode (continuous AF mode) in which focusing is consecutively performed while the third lens unit 105 is driven. Alternatively, the CPU 121 performs focusing through the first focus detection unit 121a or the second focus detection unit 121b, which is selected according to the lens information, in the second mode (one-shot AF mode) in which the third lens unit 105 is stopped at the in-focus position after focusing. The lens information is, for example, but not limited to, the lens ID, and may be information relating to focus detection stored in the lens ROM 110, for example.

The CPU 121 preferably performs the focusing through the first focus detection unit 121a in the second mode when the lens information is first information. Alternatively, the CPU 121 preferably performs the focusing through the second focus detection unit 121b when the lens information is second information.

The first information is more preferably information indicating that the third lens unit 105 is compatible with the focus detection (imaging-plane phase difference AF) by the phase difference method, that is, information indicating that the third lens unit 105 has a predetermined in-focus accuracy for the focus detection by the phase difference method. The second information is more preferably information indicating that the third lens unit 105 is not compatible with the focus detection by the phase difference method, that is, information indicating that the third lens unit 105 does not have the predetermined in-focus accuracy for the focus detection by the phase difference method.

The present embodiment performs the focusing (AF control) by the imaging-plane phase difference AF when performing the continuous AF requiring a smooth focusing operation. In contrast, when performing the one-shot AF requiring a high in-focus accuracy, the present embodiment performs the focusing by the imaging-plane phase difference AF or the contrast AF, depending on the interchangeable lens. The present embodiment thus has an improved quality of the continuous AF while the in-focus accuracy in the still image shooting is maintained, even when an interchangeable lens having a lower in-focus accuracy for the imaging-plane phase difference AF than for the contrast AF is attached to the camera body.

Second Embodiment

Next, referring to FIG. 5, a control method (focusing operation) of an image pickup apparatus in a second embodiment of the present invention will be described.

The imaging-plane phase difference AF has a lower in-focus accuracy for a higher image height than that of the contrast AF, depending on the interchangeable lens, in some cases. In light of the case that the in-focus accuracy of the imaging-plane phase difference AF may degrade for a higher image height, the present embodiment changes the focusing operation method at the one-shot AF according to the image height. In other words, the present embodiment changes the focusing operation according to a region (image height) of an imaging plane even with an imaging-plane phase difference AF compatible lens attached to the camera body. The focusing is performed by the imaging-plane phase difference AF in a region where a desired in-focus accuracy is obtained by the imaging-plane phase difference AF, for example, a central region where the image height is low. In contrast, the focusing is performed by the contrast AF in a region other than the central region, for example, a peripheral region where the image height is high.

Figure 5:
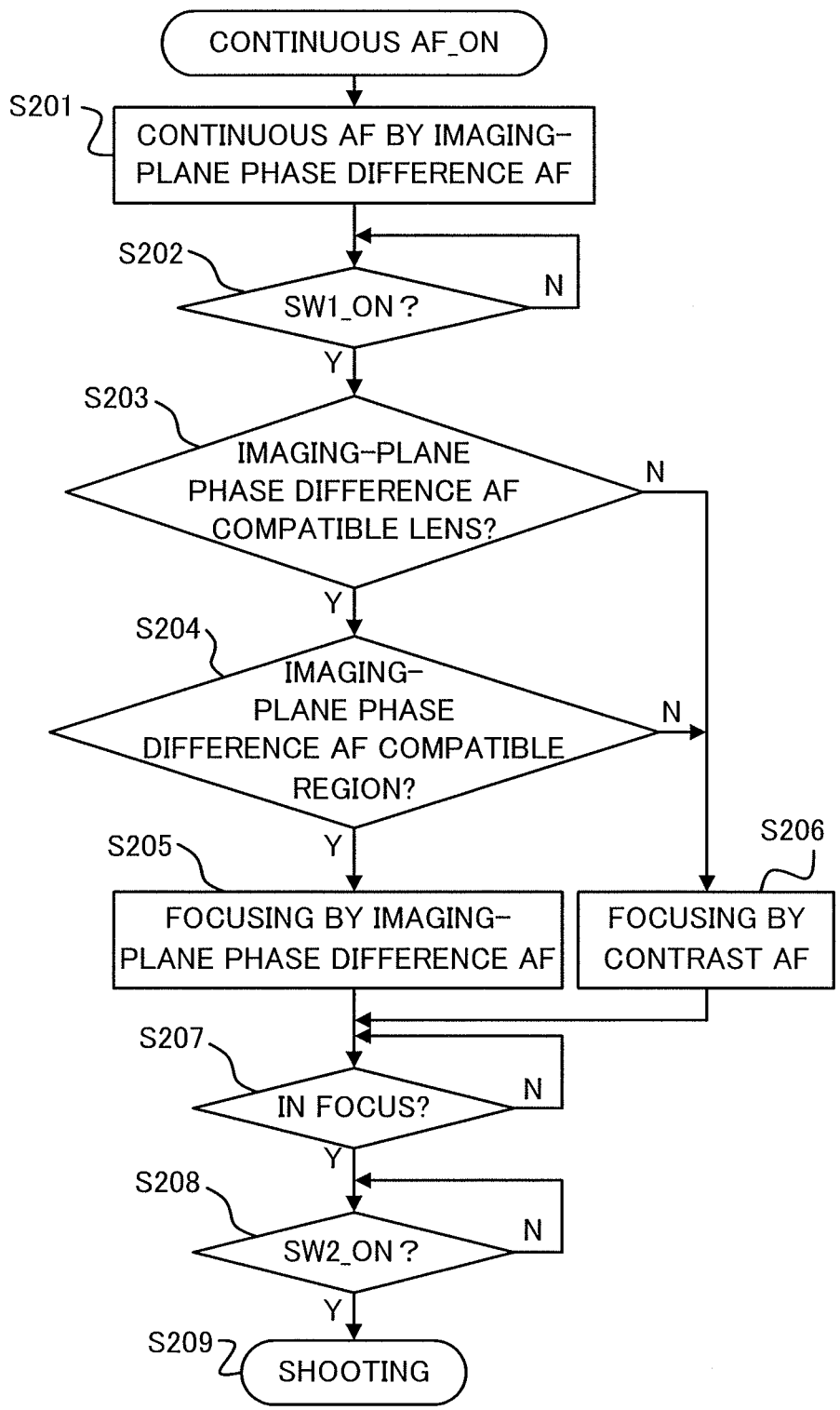
FIG. 5 is a flowchart of a focusing operation in a second embodiment.

FIG. 5 is a flowchart of the focusing operation in the present embodiment and illustrates a case where the continuous AF control is on (the continuous AF control is performed). The steps illustrated in FIG. 5 are each performed mainly in response to a command from the CPU 121. Steps S201 to S203 and S205 to S209 in FIG. 5 are the same as steps S101 to S108 in FIG. 1, respectively, and hence their descriptions are omitted.

When the CPU 121 determines at step S203 that the interchangeable lens attached to the image pickup apparatus is an imaging-plane phase difference AF compatible lens, the flow proceeds to step S204. At step S204, the CPU 121 determines whether a focus detection region (ranging region) when the release switch becomes the half-pressed state (SW1_ON) at step S202 is within an imaging-plane phase difference AF compatible region (within a predetermined region). The imaging-plane phase difference AF compatible region is a region where a desired in-focus accuracy is obtained when the one-shot AF is performed by the imaging-plane phase difference AF. The imaging-plane phase difference AF compatible region is previously stored in the ROM of the CPU 121 or other storage units. The imaging-plane phase difference AF compatible region is variable according to an interchangeable lens (lens information such as the lens ID) attached to the image pickup apparatus. The state that the focus detection region is within the imaging-plane phase difference AF compatible region may be a case where the entire focus detection region is within the imaging-plane phase difference AF compatible region or a case where at least a part of (or more than a predetermined fraction of) the focus detection region is within the imaging-plane phase difference AF compatible region.

When the focus detection region is within the imaging-plane phase difference AF compatible region at step S204, the CPU 121 performs focusing (one-shot AF) by the imaging-plane phase difference AF at step S205. When the focus detection region is not within the imaging-plane phase difference AF compatible region, the CPU 121 performs the focusing (one-shot AF) by the contrast AF at step S206.

As described above, in the present embodiment, the CPU 121 performs the focusing through the first focus detection unit 121a or the second focus detection unit 121b, which is selected according to the image height of the focus detection region, when the lens information is the first information. The CPU 121 preferably determines whether the focus detection region is within a predetermined region when the lens information is the first information. When the focus detection region is within the predetermined region, the CPU 121 performs the focusing through the first focus detection unit 121a. When the focus detection region is not within the predetermined region, the CPU 121 performs the focusing through the second focus detection unit 121b.

The present embodiment performs the focusing by the imaging-plane phase difference AF or the contrast AF, which is selected according to the image height, even when an imaging-plane phase difference AF compatible lens is attached to the camera body. The present embodiment thus has an improved quality of the continuous AF while the in-focus accuracy in the still image shooting is maintained, even when an interchangeable lens having a lower in-focus accuracy for the imaging-plane phase difference AF than for the contrast AF is attached to the camera body.

Third Embodiment

Next, referring to FIG. 6, a control method (focusing operation) of an image pickup apparatus in a third embodiment of the present invention will be described.

The imaging-plane phase difference AF has a lower in-focus accuracy than that of the contrast AF, depending on an object and the environment (image shooting scene), in some cases. The imaging-plane phase difference AF has a lower in-focus accuracy, for example, when the luminance is low or when a low contrast object or a repetitive pattern such as equally spaced stripes is shot. In light of the case that the in-focus accuracy of the imaging-plane phase difference AF may degrade at a predetermined image shooting scene, the present embodiment determines the reliability of the imaging-plane phase difference AF according to the image shooting scene. The reliability of the imaging-plane phase difference AF is determined based on various parameters of the imaging-plane phase difference AF, such as the degree of coincidence between a pair of image signals, the sharpness, the contrast ratio, the amount of correlated change, and the accumulation time, for example. When a desired reliability cannot be obtained as a result of such a reliability determination, focusing is performed with the imaging-plane phase difference AF switched to the contrast AF.

Figure 6:
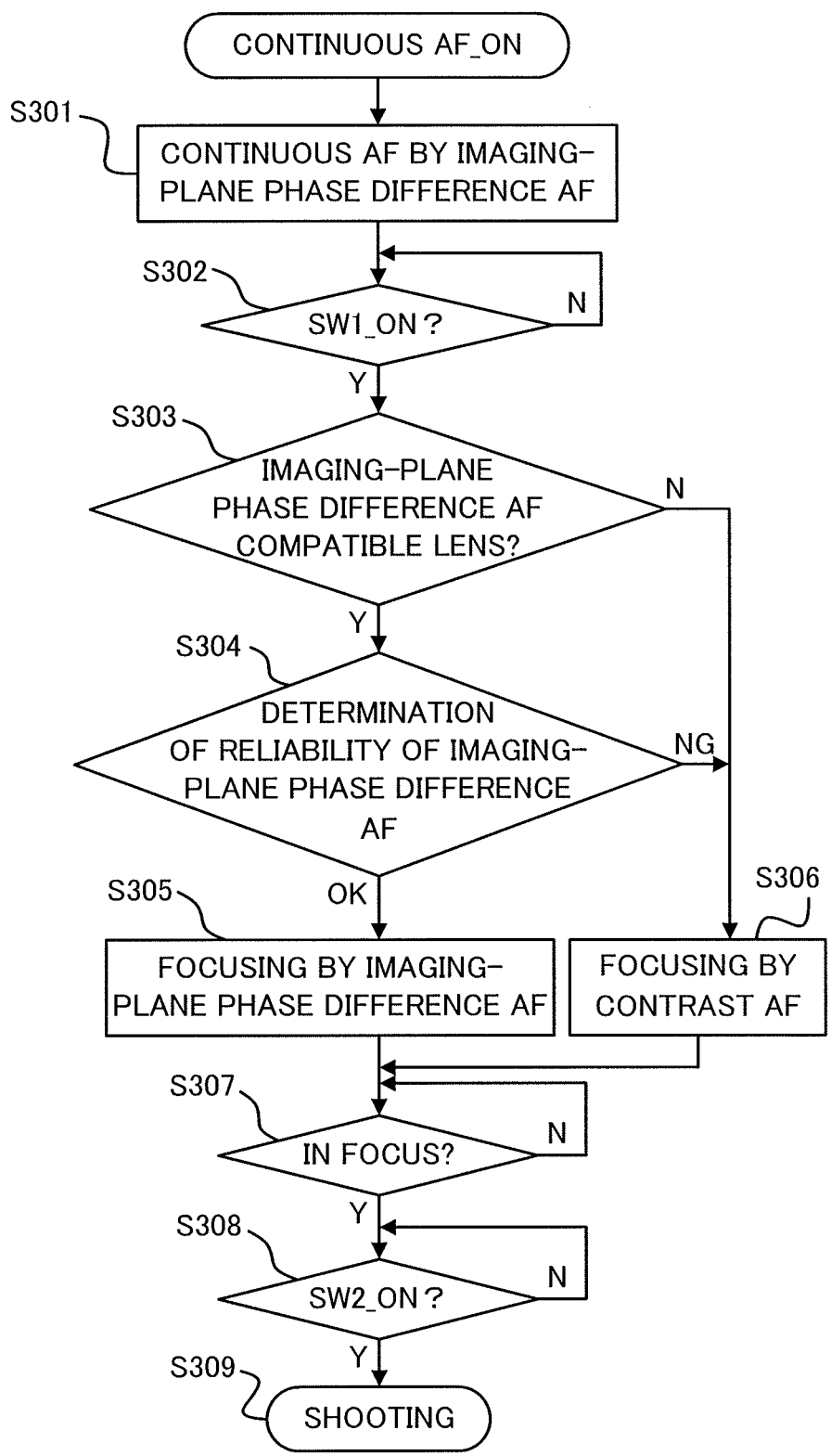
FIG. 6 is a flowchart of a focusing operation in a third embodiment.

FIG. 6 is a flowchart of the focusing operation in the present embodiment and illustrates a case where the continuous AF control is on (the continuous AF control is performed). The steps illustrated in FIG. 6 are each performed mainly in response to a command from the CPU 121. Steps S301 to S303 and S305 to S309 in FIG. 6 are the same as steps S101 to S108 in FIG. 1, respectively, and hence their descriptions are omitted.

When the CPU 121 determines at step S303 that the interchangeable lens attached to the image pickup apparatus is an imaging-plane phase difference AF compatible lens, the flow proceeds to step S304. At step S304, the CPU 121 determines the reliability of the imaging-plane phase difference AF. When this reliability determination indicates that a desired reliability cannot be obtained, the flow proceeds to step S306.

When it is determined that the desired reliability can be obtained, the flow proceeds to step S305.

When it is determined at step S304 that the desired reliability can be obtained, the CPU 121 performs focusing (one-shot AF) by the imaging-plane phase difference AF at step S305. When it is determined that the desired reliability cannot be obtained, the CPU 121 performs the focusing (one-shot AF) by the contrast AF at step S306.

As described above, in the present embodiment, the CPU 121 performs the focusing through the first focus detection unit 121a or the second focus detection unit 121b, which is selected according to the image shooting scene, when the lens information is the first information.

When the lens information is the first information, the CPU 121 preferably determines whether the image shooting scene is a scene allowing a predetermined reliability to be obtained at focus detection by the phase difference method. When the image shooting scene is the scene allowing the predetermined reliability to be obtained, the CPU 121 performs the focusing through the first focus detection unit 121a. When the image shooting scene is not the scene allowing the predetermined reliability to be obtained, the CPU 121 performs the focusing through the second focus detection unit 121b. The CPU 121 more preferably determines whether the image shooting scene is the scene allowing the predetermined reliability to be obtained, based on at least one of the degree of coincidence between a pair of image signals, the sharpness, the contrast ratio, the amount of correlated change, and the accumulation time.

The present embodiment performs focusing by the imaging-plane phase difference AF or the contrast AF, which is selected according to the image shooting scene (according to the result of the imaging-plane phase difference AF reliability determination), even when an imaging-plane phase difference AF compatible lens is attached to the camera body. The present embodiment thus has an improved quality of the continuous AF while the in-focus accuracy at still image shooting is maintained, even when an interchangeable lens having a lower in-focus accuracy for the imaging-plane phase difference AF than for the contrast AF is attached to the camera body.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the embodiments can provide the control apparatus, the image pickup system, and the control method that are capable of shooting a still image with a high in-focus accuracy while maintaining the quality of the continuous AF.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-110625, filed on May 27, 2013, which is hereby incorporated by reference herein in its entirety.

What is claimed is:

1. A control apparatus comprising:
a first focus detection processor configured to perform focus detection by a phase difference method based on an image signal obtained from an image pickup element;
a second focus detection processor configured to perform focus detection by a contrast method; and
a control processor configured to perform focusing,
wherein the control processor is configured to:
perform the focusing, in a first mode, by using a detection result of the first focus detection processor, and
perform the focusing, in a second mode, by selectively using one of the detection result of the first focus detection processor and a detection result of the second focus detection processor according to lens information,
wherein the first mode is a mode in which the focusing is repeated, and the second mode is a mode in which a lens is stopped after the focusing,
wherein the control processor, in the second mode, is configured to:
perform the focusing by using the first focus detection processor when the lens information is first information, and
perform the focusing by using the second focus detection processor when the lens information is second information,
wherein the first information is information indicating that a lens apparatus has a predetermined in-focus accuracy for the focus detection by the phase difference method, and
wherein the second information is information indicating that the lens apparatus does not have the predetermined in-focus accuracy for the focus detection by the phase difference method.

2. The control apparatus according to claim 1, wherein the lens information is information stored in a memory of a lens apparatus.

3. The control apparatus according to claim 2, wherein the lens apparatus is configured to be detachable from an image pickup apparatus including the control apparatus.

4. The control apparatus according to claim 1, wherein the control processor, in the first mode, is configured to perform the focusing by using the detection result of the first focus detection processor regardless of the lens information.

5. The control apparatus according to claim 1, wherein the first information is information indicating that the lens apparatus is compatible with the focus detection by the phase difference method.

6. The control apparatus according to claim 1, wherein the second information is information indicating that a lens apparatus is not compatible with the focus detection by the phase difference method.

7. The control apparatus according to claim 1,
wherein the control processor is configured to select one of the first focus detection processor and the second focus detection processor according to an image height of a focus detection region.

8. The control apparatus according to claim 1,
wherein when the lens information is the first information, the control processor is configured to:
select the first focus detection processor for a focus detection region within a predetermined region, and
select the second focus detection processor for the focus detection region not within the predetermined region.

9. The control apparatus according to claim 1,
wherein when the lens information is the first information, the control processor is configured to select one of the first focus detection processor and the second focus detection processor according to an image shooting scene.

10. The control apparatus according to claim 1,
wherein the second mode is a mode in which a lens of a lens apparatus is stopped at an in-focus position after the focusing.

11. The control apparatus according to claim 1,
wherein when the lens information is the first information, the control processor is configured to:
select the first focus detection processor in a case where an image shooting scene is a scene allowing a predetermined reliability to be obtained in the focus detection by the phase difference method, and
select the second focus detection processor in a case where the image shooting scene is not a scene allowing the predetermined reliability to be obtained.

12. The control apparatus according to claim 11,
wherein the predetermined reliability is based on at least one of a degree of coincidence between a pair of the image signals, sharpness, a contrast ratio, an amount of correlated change, and accumulation time.

13. The control apparatus according to claim 1,
wherein the second focus detection processor is configured to perform the focus detection by the contrast method based on an output from the image pickup element.

14. The control apparatus according to claim 1,
wherein the image pickup element is configured to output a signal for a recorded image.

15. The control apparatus according to claim 1,
wherein the control processor is configured to change the first mode to the second mode when a release switch becomes a half-pressed state.

16. A control apparatus comprising:
a first focus detection processor configured to perform focus detection by a phase difference method based on an image signal obtained from an image pickup element;
a second focus detection processor configured to perform focus detection by a contrast method; and
a control processor configured to perform focusing,
wherein the control processor is configured to:
perform the focusing, in a first mode, by using a detection result of the first focus detection processor, and
perform the focusing, in a second mode, by selectively using one of the detection result of the first focus detection processor and a detection result of the second focus detection processor according to lens information,
wherein the first mode is a mode in which the focusing is repeated, and the second mode is a mode in which a lens is stopped after the focusing,
wherein the control processor, in the second mode, is configured to:
perform the focusing by using the first focus detection processor when the lens information is first information, and
perform the focusing by using the second focus detection processor when the lens information is second information,
wherein when the lens information is the first information, the control processor is configured to:
select the first focus detection processor in a case where an image shooting scene is a scene allowing a predetermined reliability to be obtained in the focus detection by the phase difference method, and
select the second focus detection processor in a case where the image shooting scene is not a scene allowing the predetermined reliability to be obtained, and
wherein the control apparatus comprises a processor executing a program stored in a memory to implement at least a part of a function of at least one of the processors.

17. The control apparatus according to claim 16,
wherein the lens information is information stored in a memory of a lens apparatus.

18. The control apparatus according to claim 17,
wherein the lens apparatus is configured to be detachable from an image pickup apparatus including the control apparatus.

19. The control apparatus according to claim 16,
wherein the control processor, in the first mode, is configured to perform the focusing by using the detection result of the first focus detection processor regardless of the lens information.

20. The control apparatus according to claim 16,
wherein the first information is information indicating that the lens apparatus is compatible with the focus detection by the phase difference method.

21. The control apparatus according to claim 16,
wherein the second information is information indicating that a lens apparatus is not compatible with the focus detection by the phase difference method.

22. The control apparatus according to claim 16,
wherein the first information is information indicating that a lens apparatus has a predetermined in-focus accuracy for the focus detection by the phase difference method, and
wherein the second information is information indicating that the lens apparatus does not have the predetermined in-focus accuracy for the focus detection by the phase difference method.

23. The control apparatus according to claim 16,
wherein the control processor is configured to select one of the first focus detection processor and the second focus detection processor according to an image height of a focus detection region.

24. The control apparatus according to claim 16,
wherein when the lens information is the first information, the control processor is configured to:
select the first focus detection processor for a focus detection region within a predetermined region, and
select the second focus detection processor for the focus detection region not within the predetermined region.

25. The control apparatus according to claim 16,
wherein when the lens information is the first information, the control processor is configured to select one of the first focus detection processor and the second focus detection processor according to an image shooting scene.

26. The control apparatus according to claim 16,
wherein the second mode is a mode in which a lens of a lens apparatus is stopped at an in-focus position after the focusing.

27. The control apparatus according to claim 16,
wherein the predetermined reliability is based on at least one of a degree of coincidence between a pair of the image signals, sharpness, a contrast ratio, an amount of correlated change, and accumulation time.

28. The control apparatus according to claim 16,
wherein the second focus detection processor is configured to perform the focus detection by the contrast method based on an output from the image pickup element.

29. The control apparatus according to claim 16,
wherein the image pickup element is configured to output a signal for a recorded image.

30. The control apparatus according to claim 16,
wherein the control processor is configured to change the first mode to the second mode when a release switch becomes a half-pressed state.

31. An image pickup system comprising:
a lens apparatus including an image pickup optical system;
a first focus detection processor configured to perform focus detection by a phase difference method based on an image signal obtained from an image pickup element;
a second focus detection processor configured to perform focus detection by a contrast method; and
a control processor configured to perform focusing,
wherein the control processor is configured to:
  perform the focusing, in a first mode, by using a detection result of the first focus detection processor, and
  perform the focusing, in a second mode, by selectively using one of the detection result of the first focus detection processor and a detection result of the second focus detection processor according to lens information,
wherein the first mode is a mode in which focusing is repeated, and the second mode is a mode in which a lens is stopped after the focusing,
wherein the control processor, in the second mode, is configured to:
  perform the focusing by using the first focus detection processor when the lens information is first information, and
  perform the focusing by using the second focus detection processor when the lens information is second information,
wherein the first information is information indicating that a lens apparatus has a predetermined in-focus accuracy for the focus detection by the phase difference method, and
wherein the second information is information indicating that the lens apparatus does not have the predetermined in-focus accuracy for the focus detection by the phase difference method.

32. A control method comprising:
a first focus detection step of performing focus detection by a phase difference method based on an image signal obtained from an image pickup element;
a second focus detection step of performing focus detection by a contrast method; and
a control step of performing focusing,
wherein the control step includes:
  performing the focusing, in a first mode, by using a detection result of the first focus detection step, and
  performing the focusing, in a second mode, by selectively using one of the detection result of the first focus detection step and a detection result of the second focus detection step,
wherein the first mode is a mode in which the focusing is repeated, and the second mode is a mode in which a lens is stopped after the focusing,
wherein the control step, in the second mode, includes:
  performing the focusing by using the phase difference method of the first focus detection step when the lens information is first information, and
  performing the focusing by using the contrast method of the second focus detection step when the lens information is second information,
wherein the first information is information indicating that a lens apparatus has a predetermined in-focus accuracy for the focus detection by the phase difference method, and
wherein the second information is information indicating that the lens apparatus does not have the predetermined in-focus accuracy for the focus detection by the phase difference method.

33. An image pickup system comprising:
a lens apparatus including an image pickup optical system;
a first focus detection processor configured to perform focus detection by a phase difference method based on an image signal obtained from an image pickup element;
a second focus detection processor configured to perform focus detection by a contrast method; and
a control processor configured to perform focusing,
wherein the control processor is configured to:
perform the focusing, in a first mode, by using a detection result of the first focus detection processor, and
perform the focusing, in a second mode, by selectively using one of the detection result of the first focus detection processor and a detection result of the second focus detection processor according to lens information,
wherein the first mode is a mode in which focusing is repeated, and the second mode is a mode in which a lens is stopped after the focusing; and
wherein the control processor, in the second mode, is configured to:
  perform the focusing by using the first focus detection processor when the lens information is first information, and
  perform the focusing by using the second focus detection processor when the lens information is second information,
wherein the first information is information indicating that a lens apparatus has a predetermined in-focus accuracy for the focus detection by the phase difference method, and
wherein the second information is information indicating that the lens apparatus does not have the predetermined in-focus accuracy for the focus detection by the phase difference method.

34. A control method comprising:
a first focus detection step of performing focus detection by a phase difference method based on an image signal obtained from an image pickup element;
a second focus detection step of performing focus detection by a contrast method; and
a control step of performing focusing,
wherein the control step includes:
performing the focusing, in a first mode, by using a detection result of the first focus detection step, and performing the focusing, in a second mode, by selectively using one of the detection result of the first focus detection step and a detection result of the second focus detection step, and wherein the first mode is a mode in which the focusing is repeated, and the second mode is a mode in which a lens is stopped after the focusing wherein the control step, in the second mode, includes:

performing the focusing by using the phase difference method of the first focus detection step when the lens information is first information, and performing the focusing by using the contrast method of the second focus detection step when the lens information is second information, wherein when the lens information is the first information, the control step includes:

selecting the first focus detection step in a case where an image shooting scene is a scene allowing a predetermined reliability to be obtained in the focus detection by the phase difference method, and selecting the second focus detection step in a case where the image shooting scene is not a scene allowing the predetermined reliability to be obtained.

\* \* \* \* \*